the eye 6 for engaging a like eye in the rear of the body 1 for hinging the tail portion for lateral movement to the body 1.

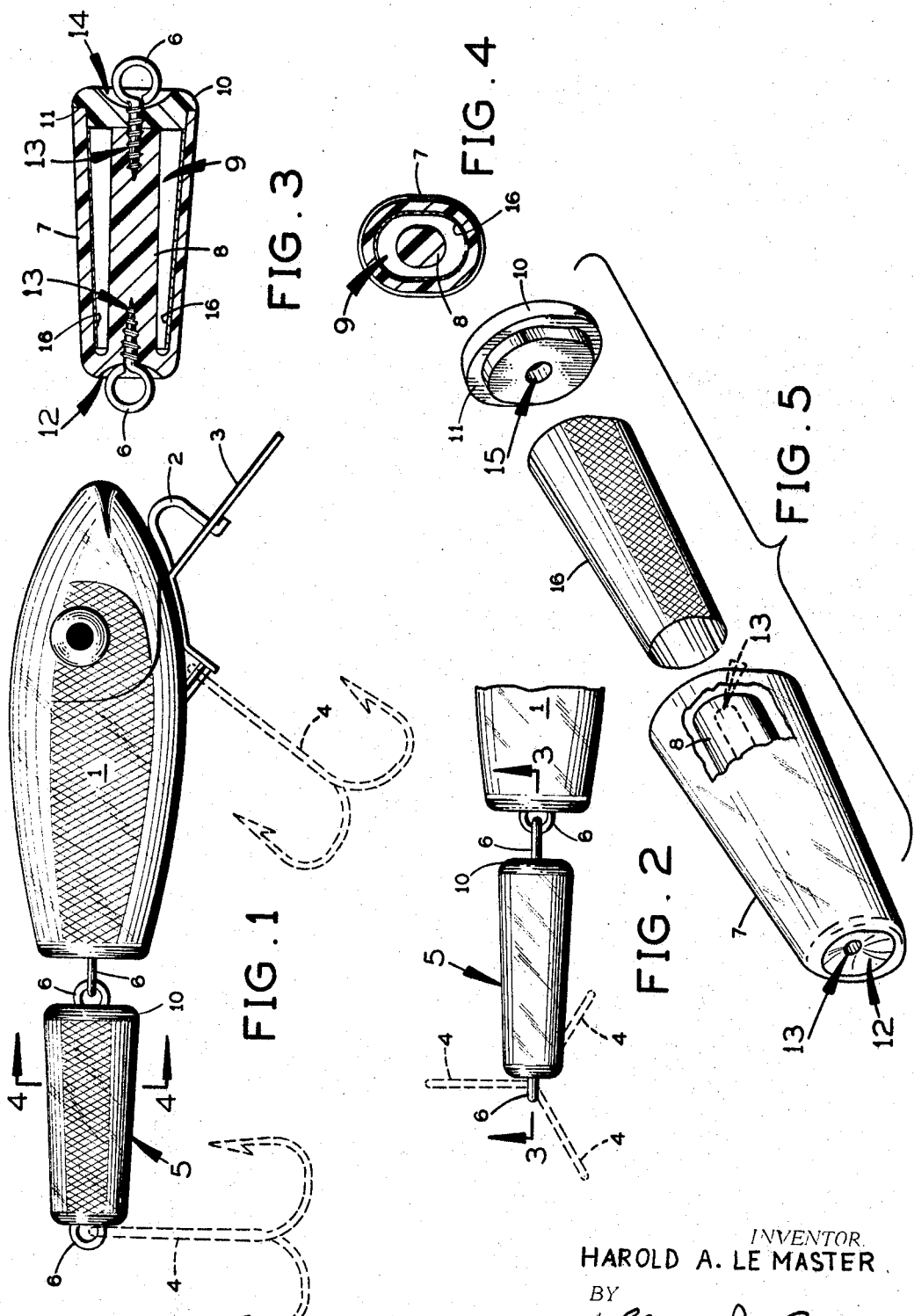

United States Patent Office 3,423,868
Patented Jan. 28, 1969

3,423,868
TAIL ASSEMBLY FOR ARTIFICIAL FISHING LURE
Harold A. Le Master, 701 N. Greenwood Ave., Clearwater, Fla. 33515
Filed Apr. 26, 1967, Ser. No. 633,796
U.S. Cl. 43—42.33
Int. Cl. A01k *85/00*
1 Claim

ABSTRACT OF THE DISCLOSURE

A tail portion for the main body of a fishing lure of the "floater" type having a hollow plastic molded body with a closure cap sealed on the open end thereof including articulate means for attaching same to the main body of the lure.

---

This invention relates in general to fishing lures and more particularly to the tail portion of an artificial lure of the floating variety which is subject to submersion when drawn by the line and the tail section thereof adapted to produce an animated motion attractive to fish.

Previous lures having hinged tail sections were usually made of dense material that was subject to sinking or of wood or other material having a finish coating applied thereto, which coating is normally subject to rapid deterioration.

The present invention overcomes the above objections and disadvantages by the provision of a hollow tail section for an artificial lure molded of plastic material, which includes air trapped therein for the purpose of flotation and is substantially indestructible insofar as finish and life is concerned, which construction is a principal object of the invention.

Another object of the invention is the provision of tail assembly for an artificial lure which includes two plastic members hermetically secured together to form a buoyant type body which will move in an animated fashion when articulated to a main lure body.

These and other objects and advantages in one embodiment of the invention are described and shown in the following specification and drawing, in which:

FIG. 1 is a side elevation of the tail assembly connected to a typical flotation type lure.

FIG. 2 is a top plan view of the tail assembly shown in FIG. 1.

FIG. 3 is an enlarged cross sectional side view of the tail assembly taken through section line 3—3, FIG. 2.

FIG. 4 is an enlarged cross sectional end view taken through section line 4—4, FIG. 1.

FIG. 5 is an enlarged perspective exploded view of elements of the tail assembly shown in FIG. 1.

Referring to FIGS. 1 and 2, a well known main body 1 of the lure is provided with a loop 2 for the attachment of a line and a deflection blade 3 for submerging the lure when drawn by the line. A typical hook 4, shown in broken lines, is pivotally connected to the lower side of the body 1. The tail assembly 5 is secured to a pair of screw eyes 6—6 threaded into the rear of the body and the front of the tail section, respectively. Another screw eye 6 is threaded into the rear of the tail assembly 5 for pivotally retaining an additional conventional hook 4, shown in broken lines.

FIGS. 3, 4, and 5 show the tail assembly elements comprising a tapered hollow tail body 7, preferably molded from transparent plastic material, such as polystyrene, butyrate, polycarbonate, or like injection materials, having an internal coaxial central post 8 integral therewith forming an annular air space 9 therein with a tapered inner surface, as shown.

It is to be noted that the cross sectional FIG. 4 illustrates the substantially elliptical shape of the tail body 7. A plastic molded end cap 10, preferably made from like material, and having a peripheral shoulder 11, is fitted in the open end of the tail body 7, against the outer periphery of the end of the body and the foreshortened end of the post 8 and is retained in the position shown in FIG. 3 by adhesive means compatible with the tail body 7 and the cap 10. The rear end of the tail body 7 has a substantially spherical depression 12 and a coaxial hole 13 into which is threaded the screw eye 6 for retaining the hook.

Likewise the cap has a substantial depression 14 in the outer end thereof and a hole 15 extending through the cap and into the post 8 for coaxially retaining the eye 6 for engaging a like eye in the rear of the body 1 for hinging the tail portion for lateral movement to the body 1.

A rolled reflecting member 16 may be made of plastic or other sheet material having a reflective outer surface.

It is to be noted that the outer surface may be formed to stimulate scales or the inner peripheral surface of the tail body 7 may be embossed to simulate the scales of a reflector member 16 when positioned against the inner periphery of the body, as shown in FIG. 3.

Having described my invention, I claim:

1. A tail assembly for articulated attachment to the rear end of the main body of a fishing lure comprising an elongated hollow tail body having a substantially elliptical cross section and uniform thickness molded from transparent plastic material and tapered from an open front end thereof to a closed blunt rear end portion thereof, a reinforcement post within said tail body substantially coaxial therewith and integral with the said rear end portion positioned in spaced relation to the tapered inner surface of said tail body forming a peripheral cavity, a closure cap on said open end of said tail body to close the said cavity including adhesive means between said cap and the said open end of said tail body to hermetically seal said cap thereon, an eye means centrally extending from the said rear end portion to retain a hook means, a second eye means extending through said closure cap into said post coaxial therewith for articulated engagement with the rear end of said body, a tubular tapered member formed from flat sheet material having a light reflective outer surface fixed in said cavity with said reflective surface in contact with the said inner surface of said tail body.

References Cited

UNITED STATES PATENTS

| 2,127,761 | 8/1938 | Beck | 43—42.33 |
| 2,510,566 | 6/1950 | Flaherty | 43—42.33 X |
| 2,593,792 | 4/1952 | Reckler | 43—42.33 X |
| 2,627,136 | 2/1953 | Sinclair | 43—42.15 X |
| 2,884,732 | 5/1959 | Bailer | 43—42.33 |
| 3,269,050 | 8/1966 | Garwood | 43—42.33 |
| 3,367,060 | 2/1968 | Abercrombie | 43—42.33 |

ALDRICH F. MEDBERY, *Primary Examiner.*

U.S. Cl. X.R.

43—42.15, 42.35